United States Patent [19]

Altman

[11] Patent Number: 4,666,657

[45] Date of Patent: May 19, 1987

[54] REMOTELY ADJUSTABLE INTERMEDIATE SEISMIC SUPPORT

[75] Inventor: Denis J. Altman, Penn Township, Westmoreland County, Pa.

[73] Assignee: Westinghouse Electric Corp., Pittsburgh, Pa.

[21] Appl. No.: 623,583

[22] Filed: Jun. 22, 1984

[51] Int. Cl.[4] ............................................. G21C 9/00
[52] U.S. Cl. ................................. 376/234; 376/262; 376/285; 188/136
[58] Field of Search .............. 376/285, 262, 234, 232, 376/228; 188/129, 136, 271, 381; 267/134

[56] References Cited

U.S. PATENT DOCUMENTS

| | | | |
|---|---|---|---|
| 3,600,276 | 8/1971 | Nims, Jr. ................................. | 376/261 |
| 4,278,498 | 7/1981 | Uhlmann et al. ..................... | 376/219 |
| 4,312,705 | 1/1982 | Stenke ................................... | 376/441 |
| 4,357,298 | 11/1982 | Wolters, Jr. et al. ................. | 376/441 |

FOREIGN PATENT DOCUMENTS 953650  3/1964  United Kingdom ................ 376/285

Primary Examiner—John F. Terapane
Assistant Examiner—Eric Jorgensen
Attorney, Agent, or Firm—R. S. Lombaro

[57] ABSTRACT

An intermediate seismic support system (100) comprises substantially square-shaped seismic support base members (102) which are suspendingly supported from rod position indicator coil assemblies (48) so as to peripherally surround control rod drive mechanism latch housings (20) in order to restrain deflections of the control rod drive mechanisms (12) under seismic conditions. In addition to being remotely installed and removed as a result of being mounted upon the RPI assemblies (48), the seismic supports are also remotely adjustable relative to one another through means of radially movable adjustment blocks (126) which are caused to move radially by means of axially movable actuator blocks (130). The latter blocks (130) are controlled by means of vertically extending actuator rods (134). A seismic support ring (150) peripherally surrounds the entire array of seismic supports (102) so as to laterally constrain the seismic supports (102), the support ring (150) adapted to be connected to the control rod drive mechanism cooling shrouds which, in turn, are connected to the nuclear reactor closure head (10).

22 Claims, 6 Drawing Figures

Fig. 2
Fig. 3
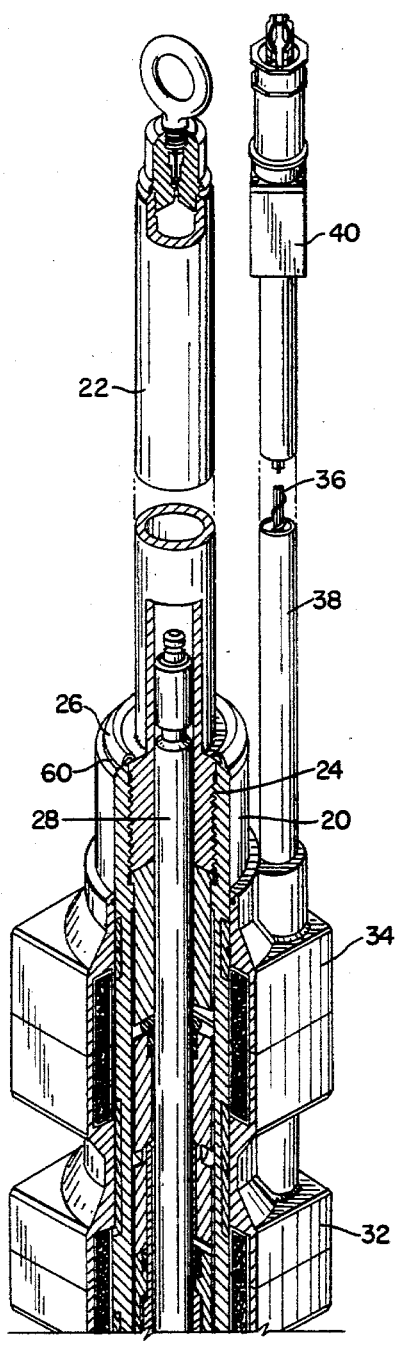
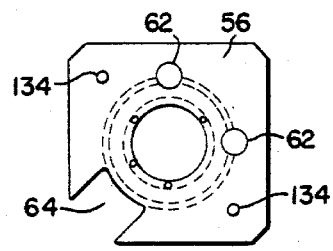

REMOTELY ADJUSTABLE INTERMEDIATE SEISMIC SUPPORT

BACKGROUND OF THE INVENTION

1. Field of the Invention

The present invention relates generally to nuclear reactor power plants or facilities, and more particularly to a remotely adjustable intermediate seismic support system which is adapted to be mounted upon the control rod drive mechanism (CRDM) latching housings so as to prevent excessive deflections of the CRDM rod travel housings under high seismic force load conditions which would otherwise or conventionally result in excessive stress loads being impressed upon the CRDM head penetration tube-reactor vessel closure head penetration welds, as well as adversely affecting the scrammability operations of the power plant or facility.

2. Description of the Prior Art

In a pressurized water reactor (PWR), the control rod drive mechanisms (CRDM), as well as the displacer rod drive mechanisms (DRDM) which control the influx or displacement of the moderator water within the reactor core, extend vertically upwardly in a cantilevered fashion from the nuclear reactor pressure vessel closure head. The lower ends of the CRDM and DRDM head penetration tubes are disposed within bores, defined within the closure head, by means of shrink fittings, and the lower end portions of the head penetration tubes are peripherally welded to the undersurface of the closure head. When the power plant or facility is then subsequently placed in operation, however, the temperature level of the atmosphere within the reactor pressure vessel is substantially increased, and consequently, it has been observed that those portions of the closure head which define the CRDM and DRDM head penetration tube bores expand radially at a rate which is greater than the radial expansion rate of the CRDM and DRDM head penetration tubes per se. Consequently, the lower ends of the CRDM and DRDM head penetration tubes are no longer supported within the reactor pressure vessel closure head by means of both the shrink fittings and the undersurface peripheral weldments, but solely by means of the weldments. It is therefore to be appreciated that such welds cannot withstand excessive stress loading due to the relatively small extent of the load bearing surfaces such weldments present to the substantial torque and bending moments to which the welds will be subjected.

When the reactor is thus subjected, for example, to seismic loads, the long rod travel housings of the CRDM and DRDM systems tend to undergo substantial deflection from their normal dispositions which, in turn, impress excessive stress loads upon the CRDM head penetration tube-pressure vessel closure head welds. In addition, should such deflection loads impressed upon the CRDM rod travel housings be especially severe as to deform the rod travel housings, the scram capabilities of the CRDM drive rods, and the control rods actuated thereby, will be adversely affected. In order to counteract these operatively deleterious effects, conventional power plants fix the upper free ends of the CRDM and DRDM rod travel housings through means of tie rods which extend between the plant or facility building walls and an upper seismic support ring which peripherally surrounds rod position indicator (RPI) coil assembly upper plates which are respectively disposed at the uppermost extent of each RPI coil assembly so as to surround the upper free end of each CRDM and DRDM rod travel housing. Such means may in fact prove substantially satisfactory for those power plants or facilities which may be located within regions that may be subjected to relatively low-level or intermediate level seismic forces in that the stress loads and adverse scrammability effects can nevertheless be maintained within acceptable limits, however, under high-level seismic loading conditions, such fixture means will prove to be entirely inadequate for achieving the desired and required restraint functions, especially in connection with the CRDM rod travel housings. More particularly, while such fixture means operatively associated with the upper free ends of the CRDM and DRDM rod travel housings may prove to be entirely satisfactory and adequate in sufficiently restraining deflection movements of the DRDM rod travel housings, even under high-level seismic loading conditions, in view of the fact that such DRDM rod travel housings do not constitute any structure which exhibits any substantial mass concentrations, the contrary, of course, is true in connection with the CRDM rod travel housings. Specifically, a substantial concentration of mass is defined within the CRDM latch housing and coil stack assemblage. Consequently, under high-level seismic loading conditions, despite the fact that the upper and lower ends of the CRDM rod travel housings are fixed, the axially central or intermediate portion thereof will undergo substantial deflection movements with manifestation of the aforenoted adverse stress loading and scrammability effects. A need therefore persisted within the prior art for a suitable means for effectively restraining the axially central or intermediate portion of each CRDM rod travel housing, particularly under high-level seismic loading conditions.

Other prior art or conventional pressurized water reactors (PWRs) did in fact seek to satisfy the aforenoted need for such an intermediate seismic support system for use in conjunction with the CRDM rod travel housings, and thereby provide a solution to the continuing and omnipresent problems of excessive CRDM rod travel housing deflections under seismic loading conditions, by the provision of a suitable intermediate seismic support structure which operatively engaged, or was operatively secured to, the CRDM rod travel housings at locations intermediate the reactor pressure vessel closure head and the upper fixed ends of the CRDM rod travel housings, however, such intermediate seismic support structures require access to be provided for the maintenance personnel in order to accomplish the required installation, adjustment, and removal operations. This is not particularly desirable in view of the fact that once the particular reactor has become operational, the region within the vicinity of the reactor pressure vessel closure head, within which the personnel would be required to work, is a moderate radiation zone. In addition, personnel access simply cannot be provided in connection with particular types of pressurized water reactors. For example, the core of one particular type of pressurized water reactor contemplated for commercial power plant usage by the assignee of the present patent application has incorporated therewithin one-hundred eighty-five (185) drive mechanisms, in particular, ninety-seven (97) control rod drive mechanisms (CRDMs) and eighty-eight (88) displacer rod drive mechanisms (DRDMs), all of which are relatively spaced on 9.996 inch center-to-center distances. Consequently, access for maintenance personnel within the vicinity of the intermediate seismic support structure cannot in fact be accommodated.

Accordingly, it is an object of the present invention to provide a new and improved intermediate seismic support structural system.

Another object of the present invention is to provide a new and improved intermediate seismic support structural system which resolves the aforenoted problems characteristic of prior art seismic support systems.

Yet another object of the present invention is to provide a new and improved intermediate seismic support structural system which will effectively prevent excessive deflections of the CRDM rod travel housings relative to the nuclear reactor pressure vessel closure head even under high-level seismic loading conditions.

Still another object of the present invention is to provide a new and improved intermediate seismic support structural system which will eliminate the requirement of providing for, or accommodating, access to such support structure in order to accomplish installation, maintenance, or removal operations.

Yet still another object of the present invention is to provide a new and improved intermediate seismic support structural system which is capable of being remotely installed, adjusted, and removed as required.

Still yet another object of the present invention is to provide a new and improved intermediate seismic support structural system which will effectively prevent adverse load conditions from being impressed upon the CRDM and DRDM penetration tube-reactor pressure vessel closure head welds, even under severe seismic loading conditions.

A further object of the present invention is to provide a new and improved intermediate seismic support structural system which will effectively prevent adverse load conditions from being impressed upon the CRDM and DRDM rod travel housings, even under severe seismic loading conditions, so as not to adversely affect the scram capabilities of the CRDM drive rod-control rod systems.

A yet further object of the present invention is to provide a new and improved intermediate seismic support structural system which can operationally interface with existing nuclear reactor pressure vessel closure head structural components or equipment, such as, for example, the CRDM coil stack assembly, the CRDM latch housing, the CRDM coil stack lead tube, the CRDM and DRDM rod travel housings, the CRDM and DRDM rod position indicator (RPI) coil assemblies, and the like, without interfering with the normal operations thereof.

A still further object of the present invention is to provide a new and improved intermediate seismic support structural system which comprises intermediate seismic support elements or components respectively mounted upon the CRDM systems in an individual or separate manner, wherein, however, the seismic support elements may be integrated together so as to provide enhanced support for the CRDM systems against lateral or transverse deflection loading.

SUMMARY OF THE INVENTION

The foregoing and other objectives are achieved in accordance with the present invention through the provision of a new and improved intermediate seismic support system which is adapted to be suspended by means of suitable clamping mechanisms from the rod position indicator (RPI) bottom plate of each rod position indicator (RPI) assembly operatively associated with each control rod drive mechanism (CRDM) assembly projecting upwardly through the nuclear reactor pressure vessel head. In this manner, when each RPI assembly is operatively mounted upon its respective CRDM assembly, and in particular, when the RPI bottom plate is seated upon a land surface peripherally surrounding the canopy seal weld defined between the rod travel housing and the latch housing of the CRDM assembly or system, the intermediate seismic support system of the present invention will be disposed in a surrounding relationship about the external circumferential surface of the CRDM latch housing.

Each intermediate seismic support system is, in turn, seen to comprise a substantially square-shaped base member or block having a large circular bore provided within the central portion thereof so as to permit the seismic support system to pass down over the CRDM rod travel housing as the RPI-seismic support system is lowered onto the CRDM latch housing. A cut-out section of the seismic support accommodates the CRDM assembly lead tube within one corner thereof, while the two corners upon opposite sides of the lead tube are provided with radially movable adjustment blocks. Actuator blocks are interposed between the radially movable adjustment blocks and the base member or block, and the actuator blocks and the adjustment blocks are provided with oppositely extending, mating wedge surfaces. Actuator rods are rotatably mounted within the base block and threadedly engaged with the actuator blocks so that upon predetermined rotation of the actuator rods, the actuator blocks are caused to move axially upwardly thereby causing the adjustment blocks to move radially outwardly so as to achieve an adjustment operation between adjacent seismic support systems and their respective CRDM assemblies. The actuator rods extend vertically upwardly from the seismic support base blocks through upper plates which form part of the CRDM RPI assemblies, the upper ends of the actuator rods being provided with suitable torque wrench means for actuation in the proper rotational mode. A seismic support ring, which is fixedly secured to the air flow ventilation shroud for the CRDM assemblies, peripherally surrounds the entire CRDM seismic support system of the present invention. The CRDM ventilation shroud is of course fixedly secured to the nuclear reactor pressure vessel head, and the latter is, in turn, fixedly secured to the plant or facility building walls by means of suitable vessel supports. Consequently, a stable support system is defined in connection with the CRDM assemblies for preventing relative deflections of the same under high-level seismic conditions. In view of the fact that the actuator rods are capable of actuation from an elevated position or level within the vicinity of the upper end of the CRDM RPI coil assembly, the seismic support system of the present invention is remotely adjustable, and of course remotely positionable or removable relative to the CRDM assemblies in view of the additional fact that the seismic support system forms, in effect, the lowermost part of the RPI coil assembly which is mounted upon, or removed from, the CRDM assemblies by means of suitable crane-type handling equipment.

As has been noted hereinbefore, normally the DRDM assemblies will not undergo appreciable lateral or transverse deflections, even under severe seismic loading conditions in view of the fact that such assemblies do not constitute any structures wherein there is a considerable concentration of mass. However, should such DRDM assemblies be likely to in fact undergo such deflection movements, or in the instance that additional assurance be desired that the DRDM assemblies do not in fact exhibit such deflectional movements, the seismic support system of the present invention additionally comprises collars or bumpers which may be disposed about the DRDM assemblies so as to interface with the CRDM seismic support systems of the present invention whereby the DRDM assemblies will have their lateral or transverse deflection movements restricted.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 2 is an elevational view, partly in section, of a CRDM system;

FIG. 3 is a plan view of a rod position indicator (RPI) assembly as operatively associated with, for example, the CRDM systems of FIG. 1;

DESCRIPTION OF THE PREFERRED EMBODIMENT

Figure 1:
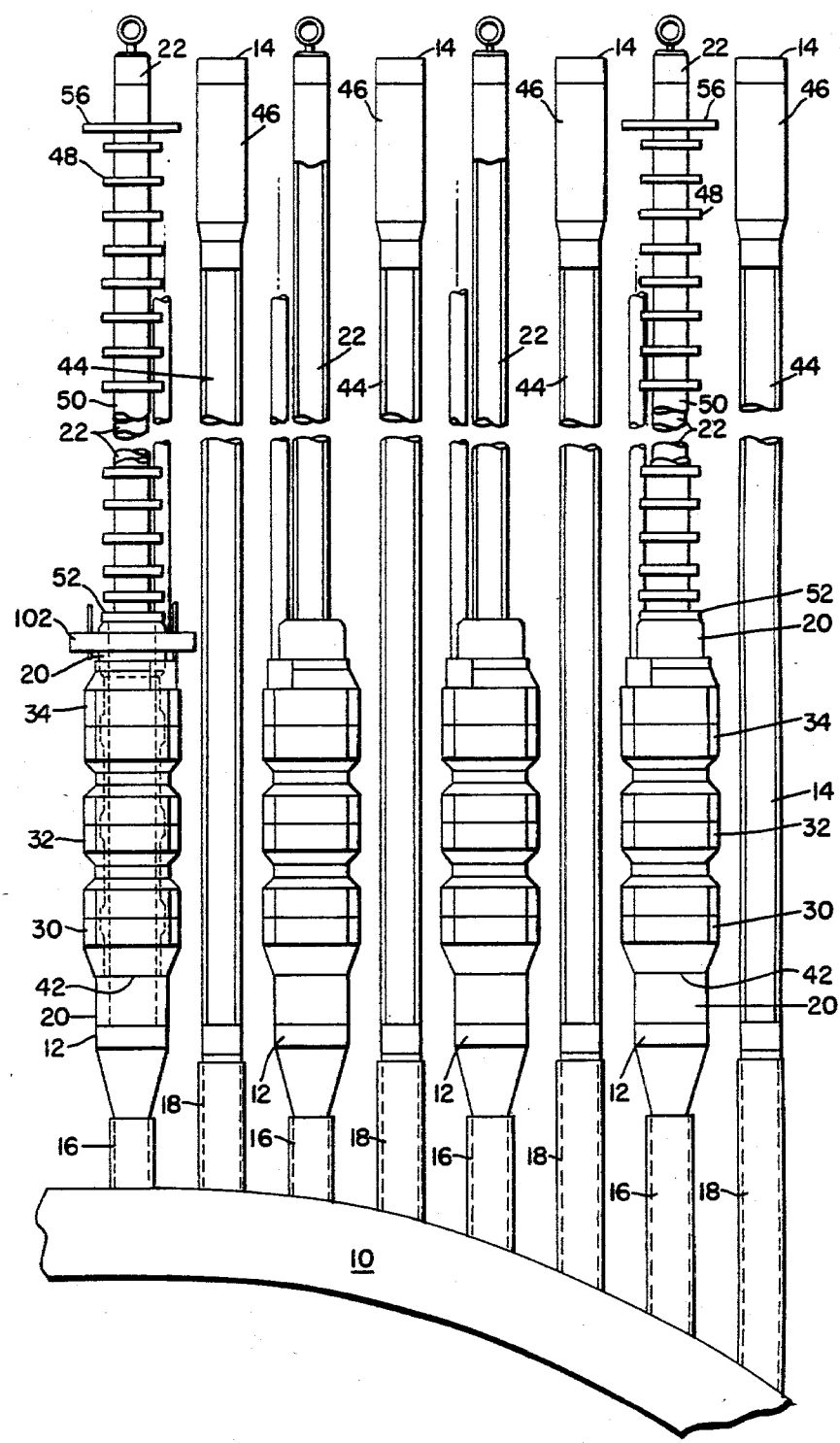
FIG. 1 is a partial elevation view of a pressurized water nuclear reactor closure head with a plurality of control rod drive mechanisms (CRDMs) and displacer rod drive mechanisms (DRDMs) mounted therein in an upstanding mode, and wherein the new and improved intermediate seismic support of the present invention is shown mounted upon the extreme left CRDM latch housing.

Referring now to the drawings, and more particularly to FIGS. 1-3 thereof, a pressurized water nuclear reactor closure head 10 has a plurality of control rod drive mechanisms (CRDMs) 12 and water displacer rod drive mechanisms (DRDMs) 14 fixedly mounted therewithin by means of closure head penetration tubes 16 and 18, respectively, such that the CRDMs 12 and the DRDMs 14 project vertically upwardly from the closure head 10 in a cantilevered manner. Each CRDM assembly or system 12 is seen to include a latch housing 20, the lower end of which is fixedly disposed within the CRDM closure head penetration tube 16, and a rod travel housing 22, the lower end of which is threadedly engaged with the upper end of the latch housing 20 as seen at 24 in FIG. 2, a canopy weld seal 26 serving to seal the annular pressure boundary defined between the latch housing 20 and the rod travel housing 22. The rod travel housings 22 comprise cylindrical tubes which serve to house and guide the vertically movable nuclear reactor control rod drive rods 28, which are of course connected to the reactor control rods, not shown, so as to drive the same either upwardly or downwardly, while each latch housing 20 similarly comprises a cylindrical tube serving to house various gripping or latching mechanisms, not shown, which are operatively associated with the control rod drive rods 28 for raising or lowering the same as may be desired or required in conjunction with reactor operations. In order to actuate or control the drive rod gripping or latching mechanisms, not shown, each CRDM assembly or system 12 is further provided with a coil stack assembly which comprises a one-piece integrated package of three, vertically spaced, but connected, eletromagnetic assemblies 30, 32, and 34. In particular, the lowermost electromagnetic assembly 30 comprises a stationary gripper magnet, the central electromagnetic assembly 32 comprises a movable gripper magnet, and the uppermost electromagnetic assembly 34 comprises a lifting magnet. The various electromagnetic assemblies 30, 32, 34 are properly and sequentially energized and de-energized so as to elevate or lower the control rod drive rods 28, and therefore the reactor core control rods controlled thereby, in a step-up or step-down jacking mode. Electrical power for the electromagnetic assemblies 30, 32, 34 is provided by means of cables 36 housed within a CRDM lead tube 38 which is vertically disposed so as to pass through one corner section of each of the electromagnetic assemblies 30, 32, 34 and thereafter extend parallel to the rod travel housing 22. The upper end of lead tube 38 is provided with a housing or receptacle 40 within which are disposed disconnectable electrical connectors, not shown, by means of which the electrical power cables 36 for the electromagnetic coil assemblies 30, 32, 34 may be electrically connected to the nuclear power plant or facility control room. It is noted at this juncture that the entire assemblage comprising the electromagnetic coil assemblies 30, 32, and 34, as well as the lead tube 38 is capable of being slideably disposed upon and about the latch housing 20 when the assemblies 30, 32, and 34, and the lead tube 38 thereof, is initially installed, for example, at the illustrated position relative to the latch housing 20, and in order to fixedly determine the axial position of the assemblies 30, 32, 34 and the lead tube 38, as well as support the weight thereof, the lower portion of the latch housing 20 is provided with an annular flange 42, as best seen in FIG. 1, upon which the electromagnetic assembly 30 is seated.

Contrary to the CRDM actuating systems as noted hereinabove, each of the nuclear reactor DRDMs 14 comprises a rod travel housing 44 within which the displacer rods, not shown, are movably housed. The displacer rods are effectively in the form of pistons disposed within the displacer rod travel housings 44, and pressurized reactor core coolant can be controlled within the rod travel housings 44 in such a manner that the displacer rods can be elevated within the rod travel housings 44 when so desired, whereas, alternatively, the pressurized coolant can be discharged from the rod travel housings 44 so as to permit the displacer rods to move downwardly under their own weight. Suitable latching means, not shown, is provided within the upper portion 46 of each DRDM assembly 14 so as to retain the DRDM drive rod in its elevated position. From the foregoing, it is therefore readily apparent that the DRDM assemblies 14 do not constitute massive electromagnetic drive systems as are characteristic of the CRDM assemblies, and consequently, the deflection movements which must be accommodated in the case of the CRDM assemblies 12, and the problems which such movements present which must necessarily be resolved, do not normally manifest themselves in connection with the DRDM assemblies 14 under seismic loading conditions.

The displacer rods, not shown, of the DRDM assemblies 14 are only adapted to be disposed within their two extreme positions, that is, an elevated UP position or a lowered DOWN position, and in order to provide maintenance or operational monitoring personnel with an indication of the disposition or location of the displacer rods so as to in fact monitor and control the operations thereof, each DRDM assembly 14 is provided with a rod position indicator (RPI) coil assembly, not shown, which briefly comprises two, vertically spaced sets of indicator coils mounted upon a substantially rigid tubular structure wherein the entire assembly is adapted to be slideably disposed upon and about the DRDM rod travel housing. In this manner, the location or disposition of the displacer rods, not shown, can in fact be monitored and controlled by suitable personnel as indicated to them by means of the RPI assemblies through means of the inductive reactance of the coils as defined between the DRDM RPI coil assemblies and the DRDM displacer rods as the displacer rods move relative to the RPI coil assemblies.

The CRDM assemblies 12 are provided with similar RPI coil assemblies 48 as best seen in FIG. 1, only two such assemblies 48 being shown. The CRDM RPI coil assemblies 48 are different from those operatively associated with the DRDM assemblies 14 in that the CRDM RPI coil assemblies 48 comprise a single set of vertically spaced coils mounted upon a tubular member 50 which is slideably disposed upon and about the CRDM rod travel housing 22. It is seen that the CRDM RPI coil assemblies extend vertically upwardly from the upper end of the CRDM latch housing 20 to the upper end of the rod travel housing 22. As may be additionally appreciated from FIGS. 3 and 5, each of the CRDM RPI coil assemblies includes a bottom plate 52 within which the tubular element 50 may have its bottom end seated and secured, as in, for example, countersunk portion 54 of bottom plate 52, and a top plate 56 which is similarly fixedly secured to the upper end of the tubular member 50. The bottom plate 52 has an annular dependent skirt 58 which is adapted to be seated upon an annular land 60 provided within the upper end of each CRDM latch housing in a peripherally surrounding relationship with respect to canopy seal weld 26, as best seen in FIG. 2. Upper plate 56 is further provided with suitable electrical connectors 62 which electrically interface with the RPI coils, as well as a square-shaped cut-out portion 64 defined within one corner thereof so as to accommodate the receptacle housing 40 of the CRDM lead tube 38 when the RPI assembly 48 is mounted upon the CRDM rod travel housing 22. The disposition of the coils throughout the RPI assembly 48 permits the monitoring of the disposition or location of the reactor control rods, not shown, which are adapted to be disposed within any one of a multitude of positions during, for example, a conventional jack-up or jack-down mode of operation.

Figure 4:
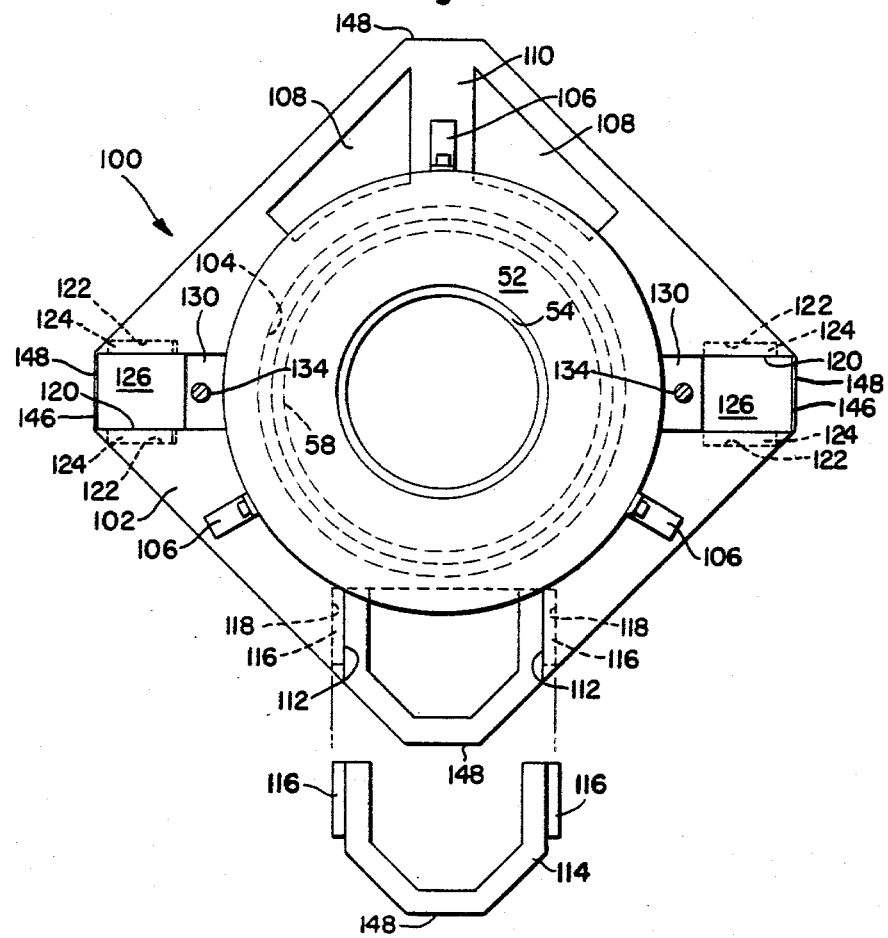
FIG. 4 is a plan view of the new and improved intermediate seismic support system of the present invention showing the cooperative parts thereof.
Figure 5:
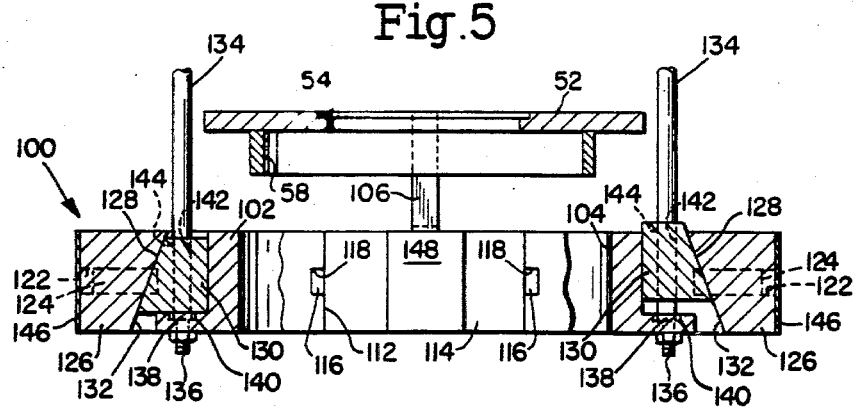
FIG. 5 is a cross-sectional view of the intermediate seismic support system of FIG. 4.
Figure 6:
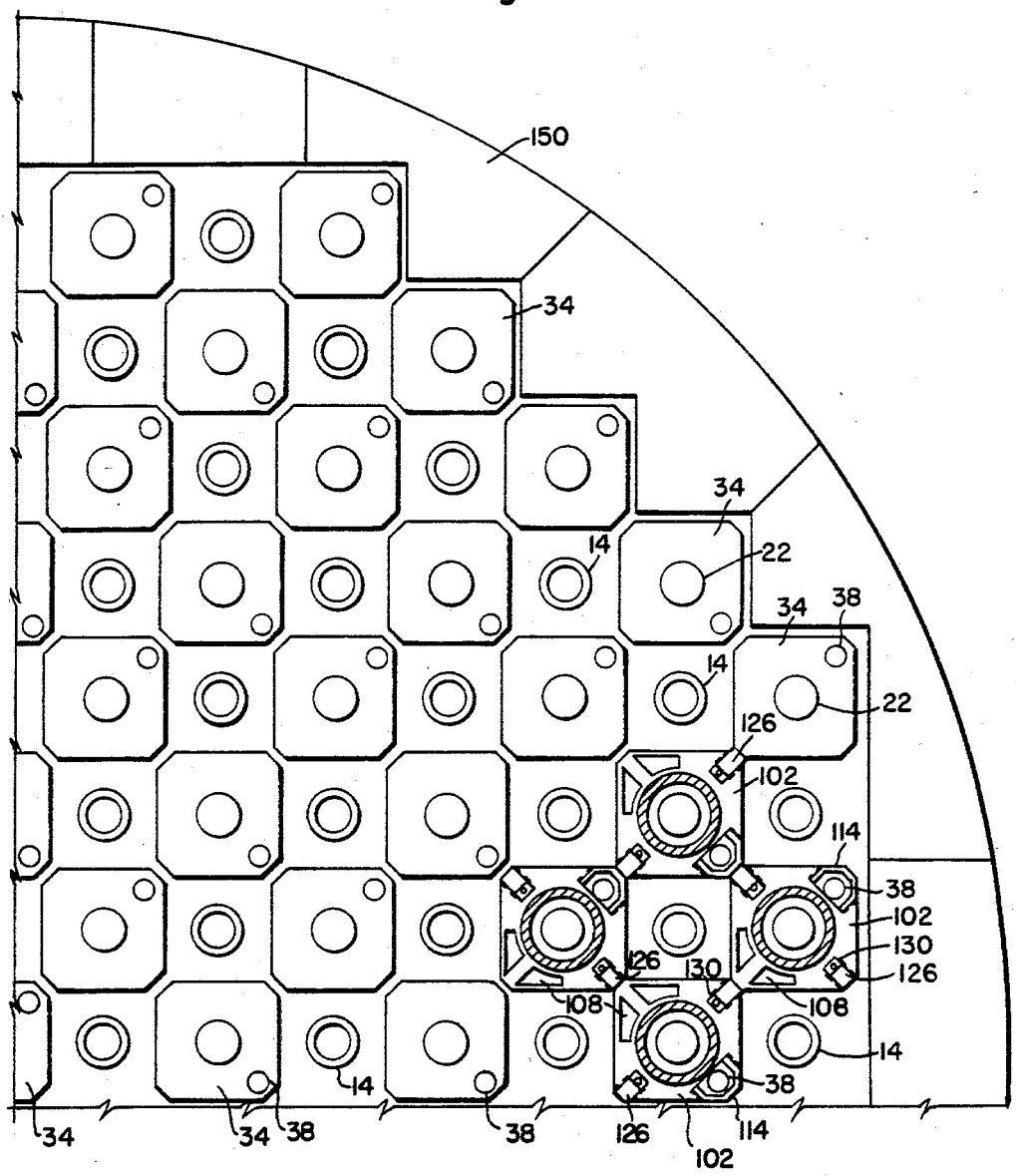
FIG. 6 is a schematic plan view of the CRDM and DRDM array of the pressurized water reactor wherein a plurality of the new and improved intermediate seismic support systems have been respectively applied to several CRDM assemblies, and the entire CRDM and DRDM array, and the intermediate seismic supports mounted thereon, are operationally interfaced with the surrounding seismic support ring structure.

In accordance with the foregoing, in order to effectively restrain the lateral or transverse deflectional movements of the CRDM assemblies 12, and particularly the movements of the CRDM latch housings 20 and coil stack assemblies 30–34, there has been developed in accordance with the present invention a remotely adjustable intermediate seismic support, generally indicated by the reference character 100, which includes a substantially square-shaped base member 102 having a central bore 104 the diametrical extent of which is slightly greater than the outside diameter of the CRDM latch housing 20 so as to define therewith an annular gap of, for example, 0.250 inches, whereby the seismic support 100 may be disposed about the latch housing 20 as seen in FIG. 1, the details of the seismic support 100 being shown in FIGS. 4–6. The seismic support 100 is adapted to be suspendingly secured to the RPI bottom plate 52 by means of, for example, three, equiangularly disposed clamping fixtures 106 disposed in a circular array about the base member 102, and consequently, when the RPI bottom plate 52 has its skirt portion 58 seated upon the CRDM latch housing land 60, the seismic support 100 will peripherally surround the latch housing 20.

As best seen from FIG. 4, and as viewed in such figure, the upper corner of the seismic support base 102 is provided with two substantially triangularly configured cutout sections 108 with a web portion 110 defined therebetween and upon which one of the clamping fixtures 106 is secured. The cut-out sections 108 provide circulating air to pass therethrough for cooling of the CRDM coil stack assemblies 30–34 whereby degradation of the same due to overheating will be positively prevented. Within the corner diametrically opposite the disposition of one of the clamping fixtures 106, there is defined a substantially rectangularly configured cut-out portion 112 within which is removably disposed a substantially U-shaped lead tube support member 114. The outer side surfaces of the legs of lead tube support 114 are provided with laterally outwardly extending keys 116 which are adapted to be slideably disposed within similarly configured mating keyways 118 defined within the base member 102. Once positioned within the keyways 118, lead tube support 114 may be bolted or pinned within the base member 102 by suitable fasteners, not shown. The removability of the lead tube support 114 permits the seismic support 100 of the present invention to be passed downwardly relative to the lead tube receptacle 40 of the lead tube 38 as the seismic support 100 is being lowered onto the CRDM assembly 12 along with the RPI coil assembly 48. Once the seismic support 100 is axially beyond or below the lead tube receptacle 40, the lead tube support 114 may be slideably disposed and secured within the base member 102 in order to adequately support the lead tube 38 relative to the CRDM latch housing 20.

Within the remaining two, diametrically opposed corners of the base member 102, there is provided means for adjusting the relative positions of the seismic supports 100 of the present invention relative to one another as well as with respect to the CRDM latch housings 20. In particular, within each of these corners of the base member 102, there is provided a substantially rectangularly configured cut-out portion 120 which is precisely the same as cut-out portion 112, however, portions 120 are smaller than portion 112. In a similar manner, the sidewalls of base member 102 which define cut-out portion 120 are provided with keyways 122 within which there is slideably disposed laterally projecting keys 124 fixedly secured upon the sides of adjustment blocks 126. The radially inner face or surface 128 of each adjustment block 126 is inclined upwardly and radially inwardly, and radially inwardly of each adjustment block 126 there is disposed a vertically movable actuator block 130. Actuator blocks 130 are disposed within the radially innermost portions of the cut-out sections 120, and in this manner, the movement of actuator blocks 130 is laterally confined. The radially outer face surface 132 of each actuator block 130 is seen to have an inclination which extends downwardly and radially outwardly, and consequently, this surface 132 is seen to comprise a mating wedge surface with respect to adjustment block surface 128. In this manner, when the actuator blocks 130 are caused to move vertically, either upwardly or downwardly, the blocks 130 cause radially outward movement, or permit radially inward movement, of the adjustment blocks 126 due to the interaction of the wedge surfaces 128 and 132, the radial movement of the adjustment blocks 126 being defined by means of the keys 124 and keyways 122.

In order to accomplish the aforenoted vertical movement of the actuator blocks 130, there is provided for each block 130 a vertically disposed actuator rod 134 which extends from the base member 102 upwardly through the RPI upper plate 56, as may also be seen from FIG. 3. The lower end of each actuator rod 134 has fixedly secured thereon a nut 136 which is disposed beneath the lower surface of the base member 102 so as to engage the same in order to prevent upward withdrawal of each actuator rod 134 out of the seismic support assembly. The upper surface of each nut 136 is also fabricated in the form of a bearing so as to permit free rotation of the actuator rod 134 relative to the base member 102 without encountering any interference therewith. A thrust bearing section 138 is also provided upon the lower end portion of each rod 134 at an axial location slightly above the nut 136, and each thrust bearing 138 is seated within a countersunk recess 140 defined within the base member 102. Directly axially above thrust bearing 138, the actuator rod 134 is provided with an axially extending externally threaded portion 142 which threadedly mates with internally threaded portions 144 defined within the actuator blocks 130. In this manner, as the actuator rods 134 are rotated, actuator blocks 130 are moved upwardly or downwardly thereby in turn affecting the radial disposition of the adjustment blocks 126. It is to be noted that by means of the provision of the thrust bearing assemblies 138–140, compression loads are borne by means of the thrust bearings 138 and the interfacial surfaces 128 and 132 of the adjustment blocks 126 and the actuator blocks 130, respectively. In this manner, should failure of an actuator rod 134 occur once a seismic support 100 has been installed and adjusted in place, no failure of the actual support 100 will occur. Actual adjustment or rotation of the actuator rods 134 is accomplished through means of torque wrench fittings integrally formed upon or fixed to the upper ends of the actuator rods 134. In this manner, maintenance personnel can of course remotely install, adjust, remove, or service the seismic support structures 100 of the present invention.

It is to be noted that in accordance with one installation mode characteristic of the present invention, the seismic support structures 100 are to be installed upon the CRDM assemlies 12 under normal or hot nuclear reactor power plant operating conditions in order to be properly positioned upon the CRDM assemblies 12 which undergo radially outward or transverse movements, as well as angular reorientations, under the heated and pressurized conditions attendant the operating facility. Under such installation conditions, the seismic support structures 100 have structural characteristics as illustrated in the accompanying drawings. Alternatively, if the illustrated seismic support structures 100 were installed and positionally adjusted under cold plant conditions, severe stresses would be developed within the structures 100, as well as within the CRDM assemblies 12, when the plant became operational and attained the aforenoted heated and pressurized conditions in view of the tendency of the CRDM assemblies 12 to undergo the aforenoted radially outward movements and angular reorientations. Accordingly, if it is desired to install the seismic support structures upon the CRDM assemblies 12 under cold plant conditions, the seismic support structures have to be structurally modified such that, for example, the bores, corresponding to bores 104 of base members 102, would be slightly eccentrically located within the base members 102 such that when the plant becomes operational, and the CRDM assemblies 12 undergo the aforenoted radial and angular movements, the CRDM assembly-seismic support structure systems will not experience the aforenoted stresses which would otherwise tend to manifest themselves. Suitable, remotely monitored TV cameras may be utilized in conjunction with the modified seismic support structures so as to insure that the eccentrically mounted seismic support structures are in fact properly mounted upon the CRDM assemblies 12 so as to accommodate the radial and angular movements of the assemblies 12 under the hot plant conditions.

Consequently, in order to prepare for the installation of the seismic support structures 100 upon the CRDM assemblies 12, measurements of the distances between the CRDM assemblies under such hot operating conditions would be initially made. Such measurements would then provide an indication of the size of shims 146 which are to be fixedly attached to the exterior surfaces of the adjustment blocks 126. The reason that the shims 146 are installed upon blocks 126, by means of bolt fasteners, for example, not shown, is that substantially large radial adjustments between adjacent seismic supports 100 cannot in fact be effected through means of the actuation of the actuator blocks 130 and the consequent radial movement of the adjustment blocks 126 because the actuator blocks 130 can only be moved a predetermined amount upwardly relative to the adjustment blocks 126 in order to preserve the proper load path defined between the actuator blocks 130 and the adjustment blocks 126. Consequently, it may be appreciated that, in effect, gross or large radially spacing adjustments between adjacent seismic supports 100 are effected by means of the interdisposition of the shims 146, while subsequent fine adjustments of the spacing between adjacent seismic supports 100 is accomplished through means of the radial movement of the adjustment blocks 126.

With reference now being made to FIG. 6, it is seen that when the intermediate seismic supports 100 are installed upon their respective CRDM latch housings 20, the most beneficial adjustment results are achieved if the coil stack assemblies 30–34 and their associated load tubes 38 are arranged in such a pattern that the diagonal plane extending between the two adjustment blocks 126 of any particular seismic support system 100 will be disposed perpendicular to the similar diagonal plane of any one of the immediately adjacent seismic support systems 100. In this manner, while adjustment within only one diagonal plane within any particular seismic support system 100 is able to be achieved when that single seismic support system 100 is considered, adjustment within both diagonal planes for any seismic support system 100 is able to be achieved when the entire lattice array of seismic support systems 100 are installed as shown in FIG. 6. It is also noted that each corner of base member 102 has a truncated configuration, as at 148 in FIG. 4, and this structural feature facilitates the mating of adjacent base members 102 relative to each other in their adjustment modes as best appreciated from FIG. 6.

In order to structurally rigidify the entire lattice network formed by means of all of the seismic support structures 100 when applied to the CRDMs 12, a seismic support ring 150, having an irregularly configured inner periphery for matching or mating with the seismic support base members 102, peripherally surrounds the aforenoted lattice network of seismic support structures 100. The seismic support ring 150 can be fabricated from several different pieces welded or bolted together, or alternatively, can be fabricated as a single integral one-piece structure, although the former is probably preferred from the standpoint of ease of fabrication and handling. In order to support the seismic support ring 150, and in turn rigidify the lattice network formed by the intermediate seismic supports 100 of the present invention, the seismic support ring 150 will be fixedly secured to the nuclear reactor CRDM and DRDM shroud assembly, not shown, which is, in turn, fixedly secured to the reactor pressure vessel head, also not shown. The latter is, of course, secured to the facility building walls by means of suitable vessel supports, also not shown.

As may be further appreciated from FIG. 6, while the DRDM assemblies 14 have not been provided with any intermediate seismic support structures as have the CRDM assemblies 12 in accordance with the present invention, if it is deemed desirable to laterally secure any deflectional movements of the DRDM assemblies 14, collars or bumpers, not shown, may be utilized in connection with the DRDM assemblies 14 so as to interface with the seismic support base members 102 of the present invention. These DRDM assembly bumpers or collars could be fixedly secured upon the DRDM RPI coil assemblies at predetermined axial positions so as to operatively cooperate with the intermediate seismic support base members 102.

Obviously, many modifications and variations of the present invention are possible in light of the above teachings. It is therefore to be understood that within the scope of the appended claims, the present invention may be practiced otherwise than as specifically described herein.

I claim:

1. An intermediate seismic support system for use in conjunction with a nuclear reactor, comprising:
   a nuclear reactor closure head;
   a plurality of control rod drive mechanisms (CRDMs) projecting upwardly from said nuclear reactor closure head, each of said control rod drive mechanisms including a latch housing within which are respectively disposed control rod drive rods; and
   an intermediate seismic support capable of being remotely installed upon each of said control rod drive mechanisms so as to peripherally surround said latch housings.

2. An intermediate seismic support system as set forth in claim 1, further comprising:
   rod position indicator coil assemblies respectively mounted upon each of said control rod drive mechanisms; and
   each of said intermediate seismic supports is respectively suspendingly supported from the lower end of each of said rod position indicator coil assemblies.

3. An intermediate seismic support system as set forth in claim 1, further comprising:
   each of said intermediate seismic supports is operatively engageable with adjacent intermediate seismic supports; and
   means for adjusting the operative engagement of said adjacent intermediate seismic supports.

4. An intermediate seismic support system as set forth in claim 3, wherein:
   said adjusting means is remotely adjustable.

5. An intermediate seismic support system as set forth in claim 3, wherein said adjusting means comprises:
   radially movable adjustment blocks.

6. An intermediate seismic support system as set forth in claim 5, further comprising:
   each of said radially movable adjustment blocks is provided with an inclined wedge surface; and
   said adjusting means further comprises axially movable actuator blocks having inclined wedge surfaces for mating with said inclined wedge surfaces of said adjustment blocks,
   whereby when said actuator blocks are moved axially, said inclined wedge surfaces of said actuator blocks cooperate with said inclined wedge surfaces of said adjustment blocks thereby forcing said adjustment to move radially.

7. An intermediate seismic support system as set forth in claim 5, wherein:
   each of said intermediate seismic supports has a substantially square-shaped configuration; and
   said radially movable adjustment blocks are disposed within two oppositely disposed corners of said square-shaped seismic supports.

8. An intermediate seismic support system as set forth in claim 7, wherein:
   the diagonal plane, connecting said two oppositely disposed corners of any one of said seismic supports within which said adjustment blocks are disposed, is disposed perpendicularly to a similar diagonal plane connecting two oppositely disposed corners of any adjacent one of said seismic supports within which adjustment blocks are also disposed.

9. An intermediate seismic support system as set forth in claim 4, wherein said remotely adjustable means comprises:
   vertically extending actuator rods mounted within said intermediate seismic support and extending upwardly to the upper region of said control rod drive mechanisms.

10. An intermediate seismic support system as set forth in claim 3, wherein:
    said adjusting means comprises shims interposed between adjacent intermediate seismic supports.

11. An intermediate seismic support system as set forth in claim 1, further comprising:
    a seismic support ring peripherally surrounding the array of intermediate seismic supports mounted upon each of said control rod drive mechanisms and adapted to be fixedly secured to said nuclear reactor closure head so as to constrain the said array of intermediate seismic supports.

12. An intermediate seismic support system for use in conjunction with a nuclear reactor, comprising:
a nuclear reactor closure head;
a plurality of control rod drive mechanisms (CRDMs) projecting upwardly from said nuclear reactor closure head, each of said control rod drive mechanisms including a latch housing within which are respectively disposed control rod drive rods;
an intermediate seismic support mounted upon each of said control rod drive mechanisms so as to peripherally surround said latch housings; and
means for remotely adjusting each of said intermediate seismic supports relative to one another.

13. An intermediate seismic support system as set forth in claim 12, wherein:
each of said intermediate seismic supports is operatively engageable with adjacent ones of said seismic supports by said remotely adjusting means.

14. An intermediate seismic support system as set forth in claim 12, wherein said remotely adjusting means comprises:
radially movable adjustment blocks having a first wedge surface defined thereon;
axially movable actuator blocks having a second wedge surface defined thereon for operative cooperation with said first wedge surface of said radially movable adjustment blocks; and
vertically extending actuator rods mounted within said intermediate seismic support for operative engagement with said actuator blocks, said rods extending upwardly to the upper regions of said control rod drive mechanisms.

15. An intermediate seismic support system as set forth in claim 14, wherein:
each of said intermediate seismic supports has a substantially square-shaped configuration; and
said radially movable adjustment blocks are disposed within two oppositely disposed corners of said square-shaped seismic supports.

16. An intermediate seismic support system as set forth in claim 15, wherein:
the diagonal plane, connecting said two oppositely disposed corners of any one of said seismic supports within which said adjustment blocks are disposed, is disposed perpendicularly with respect to a similar diagonal plane connecting two oppositely disposed corners of any adjacent one of said seismic supports within which adjustment blocks are also disposed.

17. An intermediate seismic support system as set forth in claim 12, further comprising:
means for remotely installing and removing said intermediate seismic supports upon and from, respectively, said control rod drive mechanism latch housings.

18. An intermediate seismic support system as set forth in claim 17 wherein said means for remotely installing and removing said seismic supports comprises:
a rod position indicator coil assembly disposed upon each of said control rod drive mechanisms; and
each of said intermediate seismic supports is suspendingly supported from said rod position indicator coil assembly.

19. An intermediate seismic support system as set forth in claim 12, further comprising:
a seismic support ring peripherally surrounding all of said intermediate seismic supports mounted upon each of said control rod drive mechanisms and adapted to be fixedly secured to said nuclear reactor closure head so as to rigidify the array of intermediate seismic supports.

20. An intermediate seismic support system for use in conjunction with a nuclear reactor, comprising:
a nuclear reactor closure head;
a plurality of control rod drive mechanisms (CRDMs) projecting vertically upwardly from said nuclear reactor closure head, each of said control rod drive mechanisms including a latch housing within which are respectively disposed control rod drive rods;
an intermediate seismic support disposed upon each of said control rod drive mechanisms so as to peripherally surround said latch housings;
means for remotely installing and removing said intermediate seismic supports upon said control rod drive mechanisms;
means for remotely adjusting each of said intermediate seismic supports relative to each other; and
a seismic support ring peripherally surrounding the array of intermediate seismic supports mounted upon each of said control rod drive mechanisms and adapted to be fixedly secured to said nuclear reactor closure head so as to rigidify said array of intermediate seismic supports.

21. An intermediate seismic support system for use in conjunction with a nuclear reactor, comprising:
a nuclear reactor which includes a closure head;
a plurality of control rod drive mechanisms (CRDMs) projecting upwardly from said nuclear reactor closure head, each of said control rod drive mechanisms including a latch housing within which are respectively disposed control rod drive rods; and
an intermediate seismic support capable of being remotely installed upon each of said control rod drive mechanisms so as to peripherally surround said latch housings.

22. An intermediate seismic support system for use in conjunction with a nuclear reactor, comprising:
a plurality of control rod drive mechanisms (CRDMs) projecting upwardly from a closure head of said nuclear reactor, each of said control rod drive mechanisms including a latch housing within which are respectively disposed control rod drive rods; and
an intermediate seismic support capable of being remotely installed upon each of said control rod drive mechanisms so as to peripherally surround said latch housings.

* * * * *